United States Patent
Yamaguchi et al.

(10) Patent No.: US 12,537,549 B2
(45) Date of Patent: Jan. 27, 2026

(54) RADIO FREQUENCY MODULE AND COMMUNICATION DEVICE

(71) Applicant: Murata Manufacturing Co., Ltd., Kyoto (JP)

(72) Inventors: Yukiya Yamaguchi, Kyoto (JP); Fumio Harima, Kyoto (JP); Takanori Uejima, Kyoto (JP); Yuji Takematsu, Kyoto (JP); Shunji Yoshimi, Kyoto (JP); Satoshi Arayashiki, Kyoto (JP); Mitsunori Samata, Kyoto (JP); Satoshi Goto, Kyoto (JP); Masayuki Aoike, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 441 days.

(21) Appl. No.: 18/180,199

(22) Filed: Mar. 8, 2023

(65) Prior Publication Data
US 2023/0223969 A1     Jul. 13, 2023

Related U.S. Application Data

(63) Continuation of application No. PCT/JP2021/041460, filed on Nov. 11, 2021.

(30) Foreign Application Priority Data

Nov. 13, 2020 (JP) .................................. 2020-189214

(51) Int. Cl.
*H04B 1/40*     (2015.01)
*H04B 1/03*     (2006.01)
(Continued)

(52) U.S. Cl.
CPC .................. *H04B 1/03* (2013.01); *H04B 1/08* (2013.01)

(58) Field of Classification Search
CPC ... H04B 1/03; H04B 1/08; H04B 1/04; H04B 1/16; H04B 1/40; H04B 1/24; H04B 1/28;
(Continued)

(56) References Cited

U.S. PATENT DOCUMENTS

| 8,218,934 | B1 * | 7/2012 | Jones ..................... H03F 3/2173 |
| | | | 438/479 |
| 2002/0001880 | A1 * | 1/2002 | Kobayashi ............. H05K 3/284 |
| | | | 257/E23.125 |

(Continued)

FOREIGN PATENT DOCUMENTS

| JP | 2009-541985 A | 11/2009 |
| JP | 2011-040602 A | 2/2011 |

(Continued)

OTHER PUBLICATIONS

International Search Report for PCT/JP2021/041460 dated Feb. 15, 2022.

*Primary Examiner* — Andrew Wendell
(74) *Attorney, Agent, or Firm* — McDonald Hopkins LLC (57) ABSTRACT

A radio frequency module includes a module substrate including major surfaces that face each other; a first base part that is at least partially comprised of a first semiconductor material and in which an electronic circuit is formed; a second base part that is at least partially comprised of a second semiconductor material having a thermal conductivity lower than the thermal conductivity of the first semiconductor material and in which an amplifier circuit is formed; and an external connection terminal disposed on or over the major surface. The first base part and the second base part are disposed on or over the major surface out of the major surfaces; and the second base part is disposed between the module substrate and the first base part, is joined to the first (Continued)

base part, and is connected to the major surface via an electrode.

20 Claims, 5 Drawing Sheets

(51) Int. Cl.
*H04B 1/04* (2006.01)
*H04B 1/08* (2006.01)
*H04B 1/16* (2006.01)

(58) Field of Classification Search
CPC ...... H04M 1/02; H04M 1/026; H04M 1/0277; H04M 2224/16225; H04M 2224/18; H04M 2924/181; H04M 23/00; H04M 25/065; H04M 25/07; H04M 25/18
See application file for complete search history.

(56) References Cited

U.S. PATENT DOCUMENTS

| | | | |
|---|---|---|---|
| 2005/0212106 A1* | 9/2005 | Kwon | H01L 23/49589 257/E25.031 |
| 2010/0059879 A1 | 3/2010 | Bielen | |
| 2011/0037170 A1 | 2/2011 | Shinohara | |
| 2014/0015598 A1* | 1/2014 | Groothuis | H01L 23/433 438/107 |
| 2014/0016277 A1* | 1/2014 | Chen | H01L 23/552 361/728 |
| 2015/0229017 A1* | 8/2015 | Suzuki | H01L 24/20 29/601 |
| 2016/0270261 A1* | 9/2016 | Matsuda | G11B 33/1406 |
| 2020/0007174 A1 | 1/2020 | Watanabe | |
| 2020/0075547 A1* | 3/2020 | Siomkos | H01L 25/165 |
| 2020/0203291 A1 | 6/2020 | Uejima | |
| 2020/0251459 A1 | 8/2020 | Tsuda et al. | |
| 2023/0299061 A1* | 9/2023 | Yamaguchi | H01L 24/13 455/73 |

FOREIGN PATENT DOCUMENTS

| | | |
|---|---|---|
| JP | 2020-102693 A | 7/2020 |
| JP | 2020-126921 A | 8/2020 |
| WO | 03/077317 A1 | 9/2003 |
| WO | 2018/168653 A1 | 9/2018 |

* cited by examiner

RADIO FREQUENCY MODULE AND COMMUNICATION DEVICE

CROSS REFERENCE TO RELATED APPLICATION

This is a continuation of International Application No. PCT/JP2021/041460 filed on Nov. 11, 2021 which claims priority from Japanese Patent Application No. 2020-189214 filed on Nov. 13, 2020. The contents of these applications are incorporated herein by reference in their entireties.

BACKGROUND OF THE DISCLOSURE

Field of the Disclosure

The present disclosure relates to a radio frequency module and a communication device.

Description of the Related Art

Patent Document 1 discloses a semiconductor module having a configuration in which a semiconductor chip constituting a power amplifier (amplifier) is disposed on a lower surface of a wiring board. This configuration makes it possible to lay out components on both sides of the wiring board and thereby makes it possible to reduce the size of the semiconductor module.

Patent Document 1: Japanese Unexamined Patent Application Publication No. 2011-040602

BRIEF SUMMARY OF THE DISCLOSURE

In the semiconductor module disclosed in Patent Document 1, the amplifier includes a transistor including GaAs as a material.

However, when a transistor of an amplifier is formed with a material, such as GaAs, having a low thermal conductivity, the operating temperature of the amplifier increases due to the low heat dissipation of the amplifier, and the amplification characteristics of the amplifier may be degraded. Also, because it is necessary to secure a large heat dissipation area to suppress the temperature increase, the size of the semiconductor module cannot be sufficiently reduced.

The present disclosure is made to solve the above-described problem, and the possible benefit of the present disclosure is to provide a small radio frequency module with excellent heat dissipation and a communication device.

A radio frequency module according to an aspect of the present disclosure includes a module substrate including a first major surface and a second major surface that face each other; a first base part that is at least partially comprised of a first semiconductor material and in which an electronic circuit is formed; a second base part that is at least partially comprised of a second semiconductor material having a thermal conductivity lower than a thermal conductivity of the first semiconductor material and in which an amplifier circuit is formed; and external connection terminals disposed on or over the second major surface. The first base part and the second base part are disposed on or over the second major surface out of the first major surface and the second major surface; and the second base part is disposed between the module substrate and the first base part, is joined to the first base part, and is connected to the second major surface via a first electrode.

Also, a radio frequency module according to an aspect of the present disclosure includes a module substrate including a first major surface and a second major surface that face each other; a first base part that is at least partially comprised of silicon and in which an electronic circuit is formed; a second base part that is at least partially comprised of gallium arsenide and in which an amplifier circuit is formed; and external connection terminals disposed on or over the second major surface. The first base part and the second base part are disposed on or over the second major surface out of the first major surface and the second major surface; and the second base part is disposed between the module substrate and the first base part, is joined to the first base part, and is connected to the second major surface via a first electrode.

The present disclosure makes it possible to provide a small radio frequency module with excellent heat dissipation and a communication device.

DETAILED DESCRIPTION OF THE DISCLOSURE

Embodiments of the present disclosure are described below in detail. Each of the embodiments described below represents a general or specific example. Values, shapes, materials, components, and layouts and connection configurations of the components described in the embodiments below are just examples and are not intended to limit the present disclosure. Among the components described in the examples below, components not recited in independent claims are optional components. Also, the sizes or the ratios of sizes of components illustrated in the drawings are not necessarily accurate. In the drawings, the same reference number is assigned to substantially the same components, and overlapping descriptions of those components are omitted or simplified.

Also, in the descriptions below, terms such as "parallel" and "perpendicular" indicating relationships between elements, terms such as "rectangular" indicating shapes of elements, and numerical ranges do not only indicate their exact meanings but may also indicate substantially equivalent ranges that vary by, for example, about a few percent.

In the descriptions below, when A, B, and C are mounted on or over a substrate, "C is disposed between A and B in plan view of the substrate (or the major surface of the substrate)" indicates that at least one of multiple line segments connecting given points in A and given points in B passes through the region of C in plan view of the substrate. Also, "plan view of a substrate" indicates a view of the substrate and circuit elements mounted on or over the substrate that are orthographically projected onto a plane parallel to the major surface of the substrate.

In the descriptions below, "transmission path" indicates a transmission line constituted by, for example, wires through which radio-frequency transmission signals propagate, electrodes directly connected to the wires, and terminals directly connected to the wires or the electrodes. Also, "reception path" indicates a transmission line constituted by, for example, wires through which radio-frequency reception signals propagate, electrodes directly connected to the wires, and terminals directly connected to the wires or the electrodes.

EMBODIMENT

1. Circuit Configurations of Radio Frequency Module 1 and Communication Device 5

Figure 1:
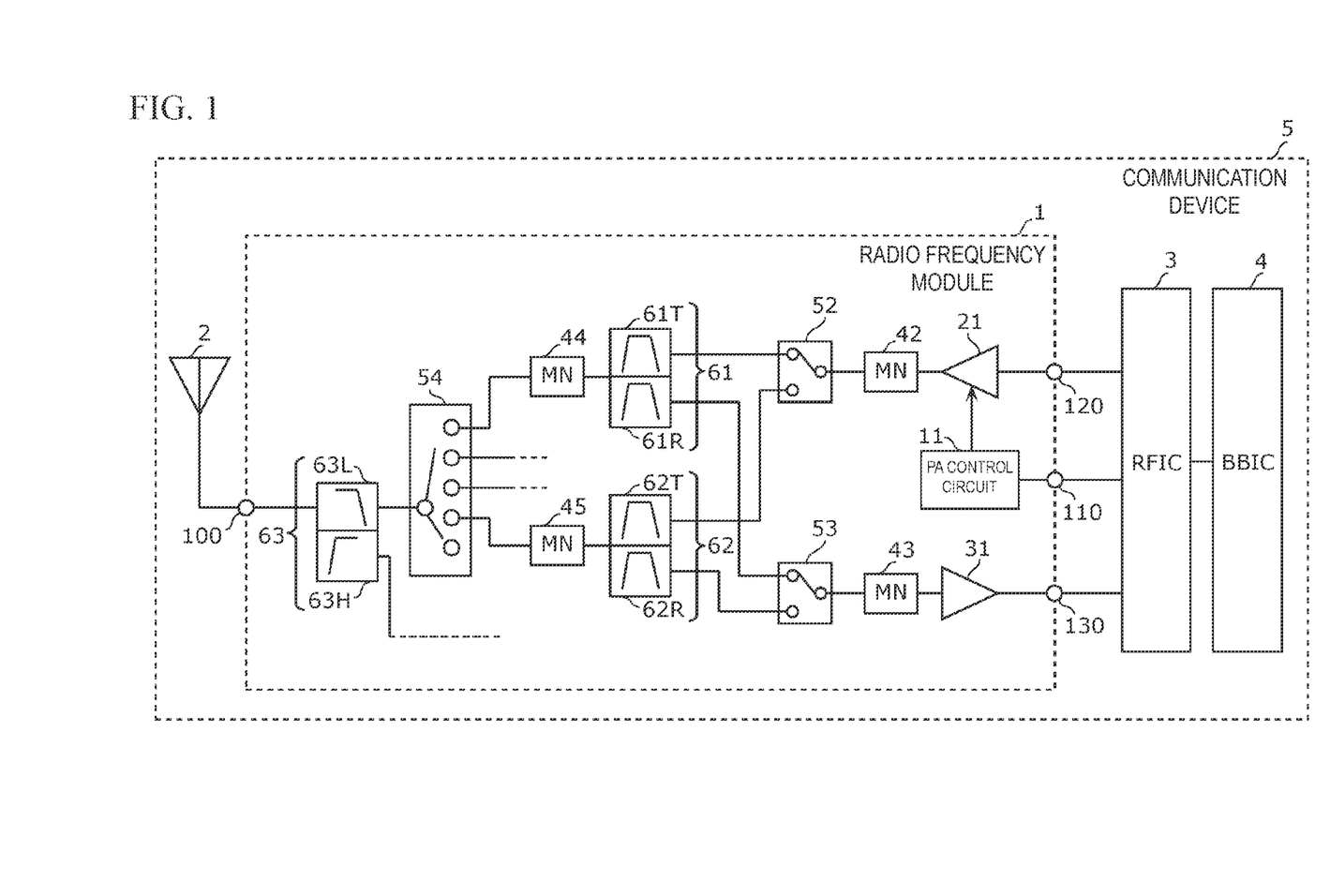
FIG. 1 is a circuit diagram of a radio frequency module and a communication device according to an embodiment.

FIG. 1 is a circuit diagram of a radio frequency module 1 and a communication device 5 according to an embodiment. As illustrated in FIG. 1, the communication device 5 includes the radio frequency module 1, an antenna 2, an RF signal processing circuit (RFIC) 3, and a baseband signal processing circuit (BBIC) 4.

The RFIC 3 is an RF signal processing circuit that processes radio frequency signals sent and received via the antenna 2. Specifically, the RFIC 3 performs signal processing, such as down-converting, on a reception signal inputted via a reception path of the radio frequency module 1 and outputs a reception signal generated by the signal processing to the BBIC 4. Also, the RFIC 3 performs signal processing, such as up-converting, on a transmission signal input from the BBIC 4 and outputs a transmission signal generated by the signal processing to a transmission path of the radio frequency module 1.

The BBIC 4 performs signal processing by using an intermediate frequency band lower than the frequency of a radio frequency signal transmitted through the radio frequency module 1. For example, a signal processed by the BBIC 4 is used as an image signal for displaying an image or as a voice signal for a call via a speaker.

The RFIC 3 also functions as a control unit that controls the connections of switches 52, 53, and 54 of the radio frequency module 1 based on a communication band (frequency band) being used. Specifically, the RFIC 3 switches the connections of the switches 52-54 of the radio frequency module 1 according to control signals (not shown). More specifically, the RFIC 3 outputs digital control signals for controlling the switches 52-54 to a PA control circuit 11. The PA control circuit 11 controls the connection and disconnection of the switches 52-54 by outputting digital control signals to the switches 52-54 according to the digital control signals input from the RFIC 3.

The RFIC 3 also functions as a control unit that controls the gain of a power amplifier 21 of the radio frequency module 1 and a power supply voltage Vcc and a bias voltage Vbias supplied to the power amplifier 21. Specifically, the RFIC 3 outputs digital control signals to a control signal terminal 110 of the radio frequency module 1. The PA control circuit 11 adjusts the gain of the power amplifier 21 by outputting a control signal and the power supply voltage Vcc or the bias voltage Vbias to the power amplifier 21 according to the digital control signals inputted via the control signal terminal 110. Here, a control signal terminal that receives, from the RFIC 3, a digital control signal for controlling the gain of the power amplifier 21 and a control signal terminal that receives, from the RFIC 3, a digital control signal for controlling the power supply voltage Vcc and the bias voltage Vbias supplied to the power amplifier 21 may be different from each other. The control unit may instead be provided outside of the RFIC 3 and may be provided in, for example, the BBIC 4.

The antenna 2 is connected to an antenna connection terminal 100 of the radio frequency module 1, emits a radio frequency signal output from the radio frequency module 1, receives a radio frequency signal from the outside, and outputs the received radio frequency signal to the radio frequency module 1.

In the communication device 5 according to the present embodiment, the antenna 2 and the BBIC 4 are optional components.

Next, a detailed configuration of the radio frequency module 1 is described.

As illustrated in FIG. 1, the radio frequency module 1 includes the antenna connection terminal 100, the power amplifier 21, the PA control circuit 11, a low-noise amplifier 31, duplexers 61 and 62, reception filters 61R and 62R, matching circuits 42, 43, 44, and 45, the switches 52, 53, and 54, a diplexer 63, the control signal terminal 110, a transmission input terminal 120, and a reception output terminal 130.

The antenna connection terminal 100 is an example of an input-output terminal and is an antenna common terminal connected to the antenna 2.

The power amplifier 21 is an amplifier circuit that amplifies radio frequency signals that are in a first communication band and a second communication band and input from the transmission input terminal 120. The power amplifier 21 is included in a second base part 20. The second base part 20 is at least partially comprised of, for example, GaAs. The power amplifier 21 includes, for example, a heterojunction bipolar transistor (HBT).

The low-noise amplifier 31 is an amplifier circuit that amplifies, with low noise, radio frequency signals in the first communication band and the second communication band and outputs the amplified radio frequency signals to the reception output terminal 130.

The PA control circuit 11 is an example of a control circuit that adjusts the gain of the power amplifier 21 according to, for example, a digital control signal inputted via the control signal terminal 110. The PA control circuit 11 is included in a first base part 10 and is comprised of, for example, a complementary metal oxide semiconductor (CMOS). Specifically, the PA control circuit 11 is formed by a silicon-on-insulator (SOI) process. This makes it possible to manufacture the PA control circuit 11 at low cost. The first base part 10 is at least partially comprised of, for example, Si.

The duplexer 61 includes a transmission filter 61T and a reception filter 61R. The duplexer 62 includes a transmission filter 62T and a reception filter 62R.

The transmission filter 61T is connected to an output terminal of the power amplifier 21 via the switch 52 and the matching circuit 42 and transmits a transmission signal in the first communication band. The transmission filter 61T is disposed in a transmission path connecting the transmission input terminal 120 to the antenna connection terminal 100. The transmission filter 62T is connected to the output terminal of the power amplifier 21 via the switch 52 and the matching circuit 42 and transmits a transmission signal in the second communication band. The transmission filter 62T is connected to a transmission path connecting the transmission input terminal 120 to the antenna connection terminal 100.

The reception filter 61R is connected to a reception path connecting the reception output terminal 130 to the antenna connection terminal 100 and transmits a reception signal in the first communication band. Also, the reception filter 62R is connected to a reception path connecting the reception output terminal 130 to the antenna connection terminal 100 and transmits a reception signal in the second communication band.

Each of the duplexers 61 and 62 may also be implemented by one filter that transmits signals according to time division duplex. In this case, a switch for switching between transmission and reception is provided in at least one of the former stage and the latter stage of the one filter.

The switch 52 includes a common terminal and two selection terminals. The common terminal of the switch 52 is connected to the output terminal of the power amplifier 21 via the matching circuit 42. One of the selection terminals of the switch 52 is connected to the transmission filter 61T, and the other one of the selection terminals of the switch 52 is connected to the transmission filter 62T. With this connection configuration, the switch 52 selects one of the connection between the power amplifier 21 and the transmission filter 61T and the connection between the power amplifier 21 and the transmission filter 62T. The switch 52 is implemented by, for example, a single-pole double-throw (SPDT) switch circuit.

The switch 53 includes a common terminal and two selection terminals. The common terminal of the switch 53 is connected to an input terminal of the low-noise amplifier 31 via the matching circuit 43. One of the selection terminals of the switch 53 is connected to the reception filter 61R, and the other one of the selection terminals of the switch 53 is connected to the reception filter 62R. With this connection configuration, the switch 53 connects and disconnects the low-noise amplifier 31 to and from the reception filter 61R and connects and disconnects the low-noise amplifier 31 to and from the reception filter 62R. The switch 53 is implemented by, for example, an SPDT switch circuit.

The switch 54 is an example of an antenna switch, is connected to the antenna connection terminal 100 via the diplexer 63, (1) connects and disconnects the antenna connection terminal 100 to and from the duplexer 61, and (2) connects and disconnects the antenna connection terminal 100 to and from the duplexer 62.

The matching circuit 42 is connected between the power amplifier 21 and the transmission filters 61T and 62T and provides the impedance matching between the power amplifier 21 and the transmission filter 61T and the impedance matching between the power amplifier 21 and the transmission filter 62T.

The matching circuit 43 is connected between the low-noise amplifier 31 and the reception filters 61R and 62R and provides the impedance matching between the low-noise amplifier 31 and the reception filter 61R and the impedance matching between the low-noise amplifier 31 and the reception filter 62R.

The matching circuit 44 is disposed in a path connecting the switch 54 to the duplexer 61 and provides the impedance matching between the combination of the antenna 2 and the switch 54 and the duplexer 61. The matching circuit 45 is disposed in a path connecting the switch 54 to the duplexer 62 and provides the impedance matching between the combination of the antenna 2 and the switch 54 and the duplexer 62.

The diplexer 63 is an example of a multiplexer and includes filters 63L and 63H. The filter 63L has a pass band corresponding to the frequency range of a first frequency band group including the first communication band and the second communication band, and the filter 63H has a pass band corresponding to the frequency range of another frequency band group having different frequencies from the first frequency band group. One terminal of the filter 63L and one terminal of the filter 63H are commonly connected to the antenna connection terminal 100. Each of the filters 63L and 63H is, for example, an LC filter including at least one of an inductor and a capacitor that are formed as chips.

The radio frequency module 1 according to the present embodiment needs to include at least the power amplifier 21 and the PA control circuit 11 among the circuit components and the circuit elements illustrated in FIG. 1.

The low-noise amplifier 31 and the switches 52-54 may be integrated into one semiconductor integrated circuit (IC). The semiconductor IC may be implemented by, for example, a CMOS. Specifically, the semiconductor IC is formed by an SOI process. This makes it possible to manufacture the semiconductor IC at low cost. The semiconductor IC may be comprised of at least one of GaAs, SiGe, and GaN. This makes it possible to output a radio frequency signal with high-quality amplification performance and noise performance.

Here, when the radio frequency module with the above circuit configuration is mounted on one mounting board, the temperature of the radio frequency module may increase due to the heat generated by the power amplifier, and the transmission characteristics of a radio frequency signal may be degraded. However, if the heat dissipation area of the radio frequency module is increased to suppress the temperature increase, the size of the radio frequency module cannot be sufficiently reduced.

In view of the above problem, the configurations of the radio frequency module 1 for achieving both improved heat dissipation and size reduction are described below.

2. Layout of Circuit Elements of Radio Frequency Module 1A According to Example

Figure 2:
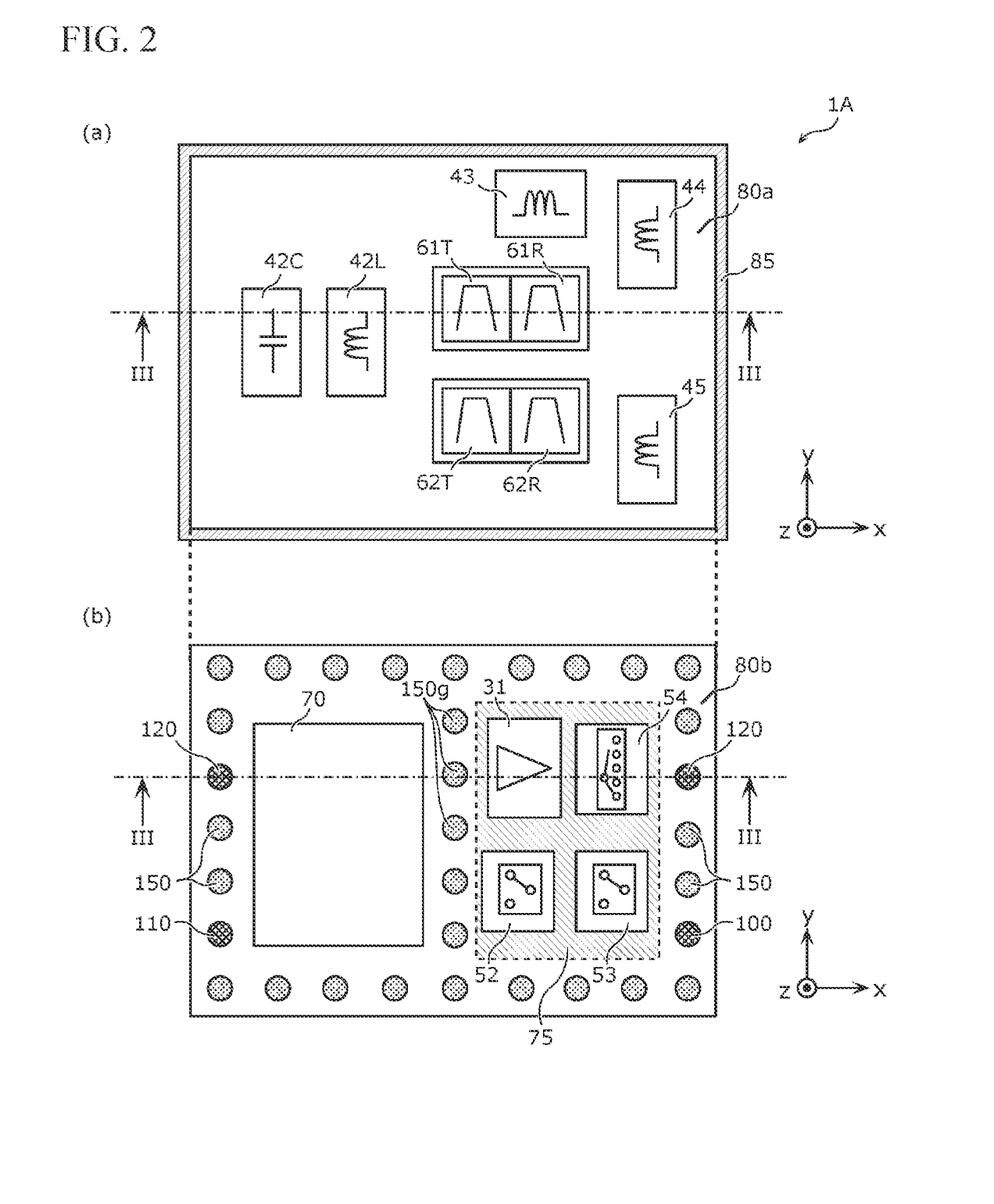
FIG. 2 is a plan-view schematic diagram of a radio frequency module according to an example.
Figure 3:
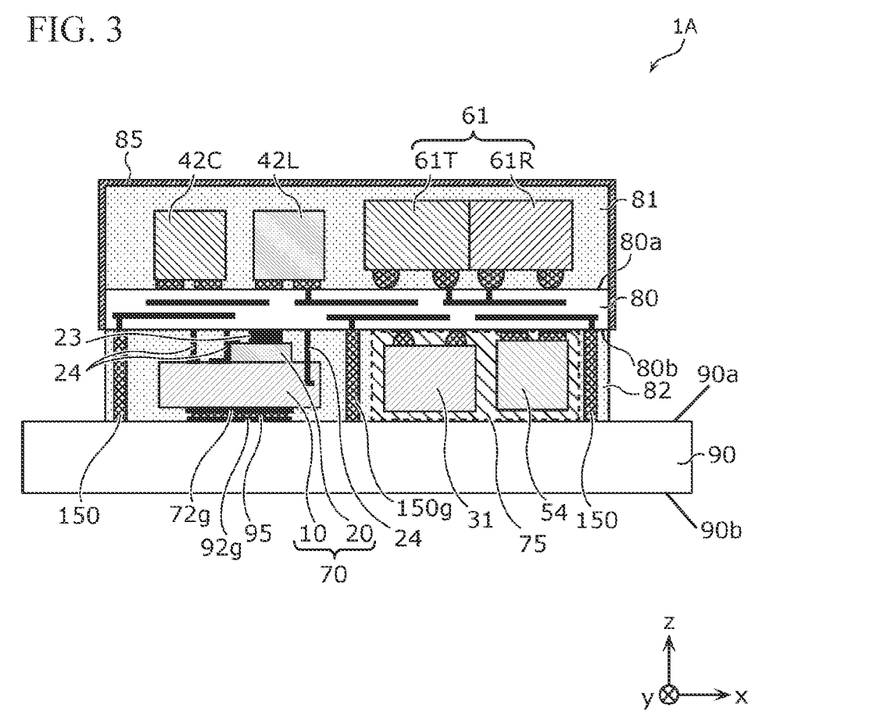
FIG. 3 is a cross-sectional schematic diagram of a radio frequency module according to an example.

FIG. 2 is a plan-view schematic diagram of a radio frequency module 1A according to an example. FIG. 3 is a cross-sectional schematic diagram of the radio frequency module 1A according to the example and is specifically a cross-sectional view taken along line III-III of FIG. 2. A module substrate 80 includes major surfaces 80a and 80b, and part (a) of FIG. 2 illustrates the layout of circuit components when the major surface 80a is viewed from the positive z-axis direction. On the other hand, part (b) of FIG. 2 is a transparent view of the layout of circuit components when the major surface 80b is viewed from the positive z-axis direction. Although circuit components in FIG. 2 are provided with symbols representing their functions to facilitate the understanding of the layout of the circuit components, such symbols are not provided in the actual radio frequency module 1.

The radio frequency module 1A according to the example represents a specific layout of circuit elements constituting the radio frequency module 1 according to the embodiment.

As illustrated in FIGS. 2 and 3, the radio frequency module 1A according to this example includes, in addition to the circuit configuration illustrated in FIG. 1, the module substrate 80, resin components 81 and 82, external connection terminals 150, a metal shield layer 85, and a semiconductor IC 70.

Here, a mounting board 90 illustrated in FIG. 3 is a mother board on or over which the radio frequency module 1A is mounted and may be included in the communication device 5 instead of being included in the radio frequency module 1A.

The semiconductor IC 70 includes the power amplifier 21 and the PA control circuit 11 illustrated in FIG. 1.

The module substrate 80 includes the major surface 80a (first major surface) and the major surface 80b (second major surface) that face each other, and circuit components constituting the radio frequency module 1A are mounted on or over the module substrate 80. The module substrate 80 is implemented by, for example, a low temperature co-fired ceramics (LTCC) substrate with a multilayer structure formed by stacking multiple dielectric layers, a high temperature co-fired ceramics (HTCC) substrate, a component built-in substrate, a substrate including a redistribution layer (RDL), or a printed-circuit board.

As illustrated in part (b) of FIG. 2, the antenna connection terminal 100, the control signal terminal 110, the transmission input terminal 120, and the reception output terminal 130 may be formed on the major surface 80b.

The resin component 81 is disposed on the major surface 80a and covers some of the circuit components constituting the radio frequency module 1A and the major surface 80a. The resin component 82 is disposed on the major surface 80b and covers some of the circuit components constituting the radio frequency module 1A and the major surface 80b. Each of the resin components 81 and 82 has a function to secure the reliability in, for example, the mechanical strength and the moisture resistance of the circuit components constituting the radio frequency module 1A. Here, the resin components 81 and 82 are optional components of the radio frequency module 1 according to the present embodiment.

In this example, the matching circuit 42 includes an inductor 42L and a capacitor 42C. Also, each of the matching circuits 43, 44, and 45 includes an inductor.

As illustrated in FIGS. 2 and 3, in the radio frequency module 1A according to this example, the semiconductor IC 70, the low-noise amplifier 31, and the switches 52-54 are disposed on or over the major surface 80b. On the other hand, the duplexers 61 and 62, the inductor 42L, the capacitor 42C, and the matching circuits 43-45 are disposed on or over the major surface 80a.

Although not illustrated in FIGS. 2 and 3, the diplexer 63 may be surface-mounted on either one of the major surfaces 80a and 80b or may be embedded in the module substrate 80.

Also, although not illustrated in FIG. 2, wires illustrated in FIG. 1 and connecting the circuit components are formed inside of the module substrate 80 and on the major surfaces 80a and 80b. Also, each of the wires may be a bonding wire the ends of which are connected to one of the major surfaces 80a and 80b and one of the circuit components constituting the radio frequency module 1A, or may be a terminal, an electrode, or a wire formed on the surface of one of the circuit components constituting the radio frequency module 1A.

In the radio frequency module 1A according to this example, multiple external connection terminals 150 are disposed on the major surface 80b. The radio frequency module 1A exchanges electric signals with the mounting board 90 disposed on the negative z-axis side of the radio frequency module 1A via the multiple external connection terminals 150. Some of the multiple external connection terminals 150 are set at the ground potential of the mounting board 90. The duplexers and the chip-like inductors and capacitors, the heights of which cannot be easily reduced, are not mounted on the major surface 80b that is one of the major surfaces 80a and 80b that faces the mounting board 90. Instead, the low-noise amplifier 31 and the switches 52-54, the heights of which can be easily reduced, are mounted on the major surface 80b. This makes it possible to reduce the height of the entire radio frequency module 1A.

The external connection terminals 150 may be columnar electrodes that pass through the resin component 82 in the z-axis direction as illustrated in FIGS. 2 and 3. Alternatively, the external connection terminals 150 may be bump electrodes formed on the major surface 80b. In this case, the resin component 82 on the major surface 80b may be omitted.

In the radio frequency module 1 according to the present embodiment, the semiconductor IC 70 and the external connection terminals 150 are disposed on or over the major surface 80b, but other circuit components may be disposed on or over either of the major surfaces 80a and 80b.

The semiconductor IC 70 includes the first base part 10 and the second base part 20.

The first base part 10 is at least partially comprised of a first semiconductor material, and an electronic circuit is formed in the first base part 10. The PA control circuit 11 is an example of the electronic circuit. The first semiconductor material is, for example, a single-element semiconductor and is specifically silicon (Si). That is, in this example, the first base part 10 is at least partially comprised of Si, and the PA control circuit 11 is formed in the first base part 10. However, the first semiconductor material is not limited to silicon. For example, the first semiconductor material may be, but is not limited to, a material including any one of gallium arsenide, aluminum arsenide (AlAs), indium arsenide (InAs), indium phosphide (InP), gallium phosphide (GaP), indium antimonide (InSb), gallium nitride, indium nitride (InN), aluminum nitride (AlN), silicon, germanium (Ge), silicon carbide (SiC), and gallium oxide (III) (Ga2O3), or may be a multi-component mixed crystal material including two or more of these substances.

The second base part 20 is at least partially comprised of a second semiconductor material having a thermal conductivity lower than the thermal conductivity of the first semiconductor material, and an amplifier circuit is formed in the second base part 20. The power amplifier 21 is an example of the amplifier circuit. The second semiconductor material is, for example, a compound semiconductor and is specifically gallium arsenide (GaAs). That is, in this example, the second base part 20 is at least partially comprised of GaAs, and the power amplifier 21 is formed in the second base part 20. However, the second semiconductor material is not limited to gallium arsenide. For example, the second semiconductor material may be, but is not limited to, a material including any one of gallium arsenide, aluminum arsenide, indium arsenide, indium phosphide, gallium phosphide, indium antimonide, gallium nitride, indium nitride, aluminum nitride, silicon germanium, silicon carbide, gallium oxide (III), and gallium bismuth (GaBi), or may be a multi-component mixed crystal material including two or more of these substances.

As illustrated in FIG. 3, the second base part 20 is disposed between the module substrate 80 and the first base part 10, is joined to the first base part 10, and is connected to the major surface 80b via an electrode 23.

The above configuration facilitates the transfer of the heat generated in the power amplifier 21 to the first base part 10 having a thermal conductivity higher than the thermal conductivity of the second base part 20. Because the heat generated in the power amplifier 21 can be dissipated via the first base part 10, the heat dissipation is improved. The first base part 10 and the second base part 20 are stacked in a direction perpendicular to the major surface 80b. Also, circuit components constituting the radio frequency module 1A are distributed to the two sides of the module substrate 80. This eliminates the need to increase the heat dissipation area of the radio frequency module 1A more than necessary and thereby makes it possible to reduce the size of the radio frequency module 1A.

The semiconductor IC 70 is described in detail below. As described above, the semiconductor IC 70 includes the first base part 10 and the second base part 20.

Figure 4:
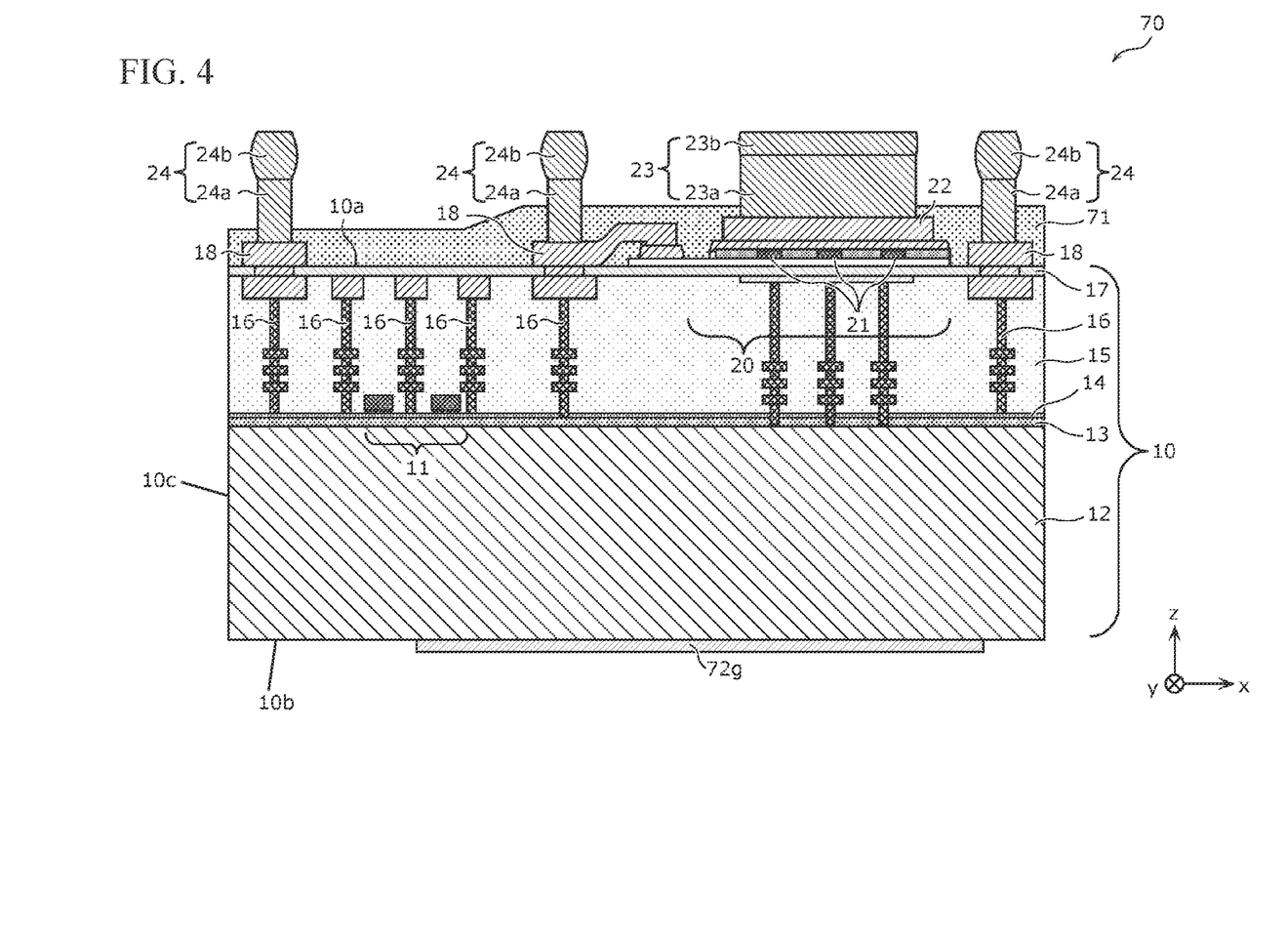
FIG. 4 is a cross-sectional diagram of a first base part according to an example.
Figure 5:
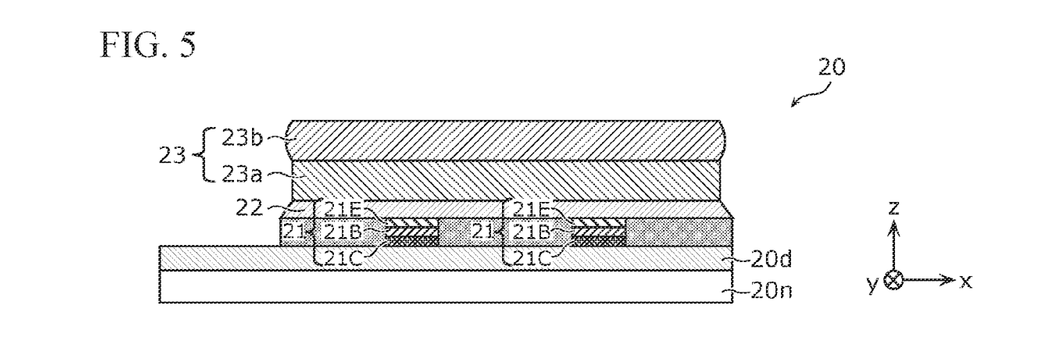
FIG. 5 is a cross-sectional diagram of a second base part according to an example.

FIG. 4 is a cross-sectional diagram of the first base part 10 according to the example. FIG. 5 is a cross-sectional diagram of the second base part 20 according to the example.

As illustrated in FIG. 4, the first base part 10 and the second base part 20 are stacked in the z-axis direction (a direction perpendicular to the major surface 80b).

The first base part 10 includes, for example, an Si substrate 12, an insulating layer 13, an Si layer 14, a wiring layer 15, and an SiN layer 17. The SiN layer 17, the wiring layer 15, the Si layer 14, the insulating layer 13, and the Si substrate 12 are stacked from the second major surface in this order.

The Si substrate 12 is comprised of, for example, a silicon single crystal.

The Si layer 14 is comprised of, for example, silicon, and circuit elements constituting the PA control circuit 11 are formed on or over the Si layer 14.

The wiring layer 15 is implemented by, for example, forming vias 16, which transmit control signals from the PA control circuit 11 to the second base part 20 and the module substrate 80, inside of a layer comprised of silicon oxide.

The SiN layer 17 is, for example, a protective layer comprised of silicon nitride and is provided to secure the reliability of the first base part 10 in, for example, moisture resistance.

The first base part 10 is connected to the major surface 80b via electrodes 24 (second electrodes) extending from the first base part 10 toward the major surface 80b. Each of the electrodes 24 includes, for example, a columnar conductor 24a and a bump electrode 24b, one end of the columnar conductor 24a is joined to an electrode 18 formed on or in the SiN layer 17, and another end of the columnar conductor 24a is joined to the bump electrode 24b. The bump electrode 24b is connected to an electrode formed on the major surface 80b.

This enables the electronic circuit in the first base part 10 to exchange radio frequency signals and digital signals directly with the module substrate 80 and thereby makes it possible to reduce signal transmission loss.

Here, as long as the first base part 10 includes the Si substrate 12 and electronic circuits, such as the PA control circuit 11, other layers may be omitted. Also, the switches 52-54 may be included in the first base part 10.

The first base part 10 may also exchange signals with the mounting board 90 via wires formed inside of and on the side surfaces of the Si substrate 12.

As illustrated in FIG. 4, the first base part 10 includes a major surface 10a (third major surface) and a major surface 10b (fourth major surface) that face each other. A metal layer 72g is formed on the major surface 10b.

This makes it possible to transfer the heat generated in the power amplifier 21 of the second base part 20 to the outside via the first base part 10 and the metal layer 72g. Accordingly, the heat dissipation of the radio frequency module 1A is improved.

The metal layer 72g may be connected to the ground of the power amplifier 21 and the ground of the PA control circuit 11.

This makes it possible to give the metal layer 72g both a heat dissipation function and an electromagnetic-field shielding function.

A resin component 71 is disposed on the major surface 10a of the first base part 10. Also, the resin component 71 covers the second base part 20.

As illustrated in FIG. 5, the second base part 20 includes, for example, a GaAs base layer 20n and an epitaxial layer 20d.

The GaAs base layer 20n is, for example, a single-crystal substrate including gallium arsenide.

The epitaxial layer 20d is formed by, for example, epitaxially growing GaAs on the GaAs base layer 20n.

The power amplifier 21 is formed on, for example, the epitaxial layer 20d.

The GaAs base layer 20n is joined to the SiN layer 17 of the first base part 10. In other words, the second base part 20 is joined to the first base part 10.

The power amplifier 21 includes amplification transistors, and each of the amplification transistors includes a collector layer 21C, a base layer 21B, and an emitter layer 21E. The collector layer 21C, the base layer 21B, and the emitter layer 21E are stacked in this order on the epitaxial layer 20d. That is, in each of the amplification transistors, the collector layer 21C, the base layer 21B, and the emitter layer 21E are stacked in this order from the side closer to the first base part 10.

The second base part 20 is connected to the major surface 80b via an electrode 23 (first electrode) extending from the second base part 20 toward the major surface 80b. The electrode 23 includes, for example, a columnar conductor 23a and a bump electrode 23b, one end of the columnar conductor 23a is joined to an electrode 22 formed on the major surface of the second base part 20, and another end of the columnar conductor 23a is joined to the bump electrode 23b. The bump electrode 23b is connected to an electrode formed on the major surface 80b.

This configuration enables the amplifier circuit of the second base part 20 to exchange signals directly with the module substrate 80 and thereby makes it possible to reduce signal transmission loss.

The electrode 23 may also be connected to the ground of the power amplifier 21. This makes it possible to give the electrode 23 a heat dissipation function and an electromagnetic-field shielding function.

The amplifier circuit of the second base part 20 may also receive, for example, digital control signals and direct-current signals from the electronic circuit of the first base part 10 through the vias 16.

Also, as illustrated in FIG. 4, in plan view of the module substrate 80, the joint interface between the first base part 10 and the second base part 20 may at least partially overlap the metal layer 72g.

This makes it possible to minimize the length of the heat dissipation path formed by the second base part 20, the first base part 10, and the metal layer 72g and thereby improve the heat dissipation.

Also, as illustrated in FIG. 4, the second base part 20 may be thinner than the first base part 10. In other words, the thickness of the second base part 20 in the thickness direction (z-axis direction) may be less than the thickness of the first base part 10 in the thickness direction (z-axis direction).

With this configuration, because the second base part 20 with a low thermal conductivity is relatively thin and the first base part 10 with a high thermal conductivity is relatively thick, the heat conduction from the second base part 20 to the first base part 10 is facilitated and the heat dissipation is improved.

As illustrated in FIG. 4, the first base part 10 includes a side surface 10c connecting the major surface 10a to the major surface 10b. Here, the arithmetic average roughness of the major surface 10a may be greater than the arithmetic average roughness of the side surface 10c.

When a reference line is set at the average height of an irregular surface, arithmetic average roughness indicates an average value of height (or depth) from the reference line in a given section. A smaller value of the arithmetic average roughness indicates a flatter and smoother surface.

This makes it possible to increase the surface area of the major surface 10b and thereby makes it possible to improve the heat transfer from the major surface 10b of the first base part 10 to the outside.

As illustrated in FIGS. 3 and 4, in plan view of the module substrate 80, the second base part 20 does not extend beyond the outer edge of the first base part 10. In other words, the area of the second base part 20 is less than the area of the first base part 10 in the plan view.

Referring back to FIGS. 2 and 3, the layout of the radio frequency module 1A according to the example is further described.

The low-noise amplifier 31 is disposed on or over the major surface 80b. Here, in plan view of the module substrate 80, ground terminals 150g are disposed on or over the major surface 80b and between the semiconductor IC 70 and the low-noise amplifier 31.

With this configuration, because the ground terminals 150g are disposed between the power amplifier 21 and the low-noise amplifier 31, the isolation between the transmission and the reception is improved.

The capacitor 42C and the inductor 42L, which are connected to the output terminal of the power amplifier 21, are disposed on or over the major surface 80a. Here, in plan view of the module substrate 80, the inductor 42L at least partially overlaps the second base part 20.

This makes it possible to shorten the wiring connecting the power amplifier 21 to the matching circuit 42 and thereby makes it possible to reduce the transmission loss of transmission signals.

The low-noise amplifier 31 and the switches 52-54 may be included in a semiconductor IC 75. This makes it possible to reduce the size of the radio frequency module 1A.

The communication device 5 according to the present embodiment also includes the mounting board 90 on or over which the radio frequency module 1A is mounted. An electrode 92g (third electrode) is formed on a major surface 90a of the mounting board 90. The electrode 92g is connected to the metal layer 72g via solder 95.

The above configuration facilitates that the heat generated in the power amplifier 21 is transferred to the first base part 10 having a thermal conductivity higher than the thermal conductivity of the second base part 20 and is further transferred to the mounting board 90. This in turn eliminates the need to increase the heat dissipation area of the communication device 5 more than necessary and thereby makes it possible to reduce the size of the communication device 5.

The metal layer 72g and the electrode 92g may be ground electrodes.

In the communication device 5, the metal layer 72g, the solder 95, and the electrode 92g may be omitted, and the major surface 10b may be in direct contact with the major surface 90a. This also facilitates the transfer of the heat generated in the power amplifier 21 to the mounting board 90.

3. Effects

As described above, the radio frequency module 1A according to this example includes the module substrate 80 including the major surfaces 80a and 80b that face each other; the first base part 10 that is at least partially comprised of the first semiconductor material and in which the electronic circuit is formed; the second base part 20 that is at least partially comprised of the second semiconductor material having a thermal conductivity lower than the thermal conductivity of the first semiconductor material and in which the amplifier circuit is formed; and the external connection terminals 150 disposed on or over the major surface 80b. The first base part 10 and the second base part 20 are disposed on or over the major surface 80b out of the major surfaces 80a and 80b; and the second base part 20 is disposed between the module substrate 80 and the first base part 10, is joined to the first base part 10, and is connected to the major surface 80b via the electrode 23.

Also, the radio frequency module 1A according to this example includes the module substrate 80 including the major surfaces 80a and 80b that face each other; the first base part 10 that is at least partially comprised of silicon and in which the electronic circuit is formed; the second base part 20 that is at least partially comprised of gallium arsenide and in which the amplifier circuit is formed; and the external connection terminals 150 disposed on or over the major surface 80b. The first base part 10 and the second base part 20 are disposed on or over the major surface 80b out of the major surfaces 80a and 80b; and the second base part 20 is disposed between the module substrate 80 and the first base part 10, is joined to the first base part 10, and is connected to the major surface 80b via the electrode 23.

The above configurations facilitate the transfer of the heat generated in the amplifier circuit to the first base part 10 having a thermal conductivity higher than the thermal conductivity of the second base part 20. This makes it possible to dissipate the heat generated in the amplifier circuit via the first base part 10 and thereby makes it possible to improve the heat dissipation. Furthermore, because the first base part 10 and the second base part 20 are disposed on or over the second major surface that is closer to the external substrate out of the first major surface and the second major surface, the transfer of the heat generated in the amplifier circuit to the outside of the radio frequency module 1A is facilitated. Also, the first base part 10 and the second base part 20 are stacked in a direction perpendicular to the major surface 80b. Also, circuit components constituting the radio frequency module 1A are distributed to the two sides of the module substrate 80. This eliminates the need to increase the heat dissipation area of the radio frequency module 1A more than necessary and thereby makes it possible to reduce the size of the radio frequency module 1A.

In the radio frequency module 1A, the first base part 10 includes the major surfaces 10a and 10b that face each other, the second base part 20 is joined to the major surface 10a of the first base part 10, and the radio frequency module 1A may further include the metal layer 72g formed on the major surface 10b.

This makes it possible to transfer the heat generated in the amplifier circuit of the second base part 20 to the outside via the first base part 10 and the metal layer 72g. Accordingly, the heat dissipation of the radio frequency module 1A is improved.

In the radio frequency module 1A, the metal layer 72g may be connected to the ground of the amplifier circuit and the ground of the electronic circuit.

This makes it possible to give the metal layer 72g both a heat dissipation function and an electromagnetic-field shielding function.

In the radio frequency module 1A, in plan view of the module substrate 80, the joint interface between the first base part 10 and the second base part 20 may at least partially overlap the metal layer 72g.

This makes it possible to minimize the length of the heat dissipation path formed by the second base part 20, the first base part 10, and the metal layer 72g and thereby improve the heat dissipation.

The second base part 20 may be thinner than the first base part 10.

With this configuration, because the second base part 20 with a low thermal conductivity is relatively thin and the first base part 10 with a high thermal conductivity is relatively thick, the heat conduction from the second base part 20 to the first base part 10 is facilitated, and the heat dissipation is improved.

Also, in the radio frequency module 1A, the first base part 10 may further include the side surface 10c connecting the major surface 10a to the major surface 10b, the second base part 20 may be joined to the major surface 10a of the first base part 10, and the arithmetic average roughness of the major surface 10b may be greater than the arithmetic average roughness of the side surface 10c.

This makes it possible to increase the surface area of the major surface 10b and thereby makes it possible to improve the heat dissipation from the major surface 10b of the first base part 10 to the outside.

In the radio frequency module 1A, the first base part 10 may be connected to the major surface 80b via the electrodes 24.

This enables the electronic circuit in the first base part 10 to exchange radio frequency signals and digital signals directly with the module substrate 80 and thereby makes it possible to reduce signal transmission loss.

In the radio frequency module 1A, the amplifier circuit may include the power amplifier 21.

The power amplifier 21 is a circuit component that generates the highest amount of heat among the circuit components constituting the radio frequency module 1A. However, the above configuration of the radio frequency module 1A makes it possible to effectively dissipate the heat generated by the power amplifier 21.

The power amplifier 21 may include amplification transistors each of which includes the collector layer 21C, the base layer 21B, and the emitter layer 21E. The collector layer 21C, the base layer 21B, and the emitter layer 21E may be stacked in this order from the side closer to the first base part 10.

The radio frequency module 1A may further include the low-noise amplifier 31 disposed on or over the major surface 80b. In plan view of the module substrate 80, the ground terminals 150g may be disposed on or over the major surface 80b and between the first and second base parts 10 and 20 and the low-noise amplifier 31.

With this configuration, because the ground terminals 150g are disposed between the power amplifier 21 and the low-noise amplifier 31, the isolation between the transmission and the reception is improved.

In the radio frequency module 1A, the electronic circuit may include a control circuit that controls the amplifier circuit.

This makes it possible to shorten the control wiring connecting the amplifier circuit to the control circuit.

In the radio frequency module 1A, the first semiconductor material may be silicon.

In the radio frequency module 1A, the second semiconductor material may be gallium arsenide.

The radio frequency module 1A may further include an impedance matching element connected to the amplifier circuit, and the impedance matching element may be disposed on or over the major surface 80a and may at least partially overlap the second base part 20 in plan view of the module substrate 80.

This makes it possible to shorten the wiring connecting the amplifier circuit to the impedance matching element and thereby makes it possible to reduce the transmission loss of radio frequency signals.

The communication device 5 includes the RFIC 3 that processes radio frequency signals transmitted and received by the antenna 2 and the radio frequency module 1 that transmits the radio frequency signals between the antenna 2 and the RFIC 3.

This makes it possible to provide a small communication device 5 with excellent heat dissipation.

The communication device 5 may further include the mounting board 90 on or over which the radio frequency module 1A is mounted, and the major surface 90a of the mounting board 90 may be in contact with the major surface 10b.

In the communication device 5, the electrode 92g formed on the major surface 90a of the mounting board 90 may be connected to the metal layer 72g via the solder 95.

This configuration facilitates that the heat generated in the amplifier circuit is transferred to the first base part 10 having a thermal conductivity higher than the thermal conductivity of the second base part 20 and is further transferred to the mounting board 90. This in turn eliminates the need to increase the heat dissipation area of the communication device 5 more than necessary and thereby makes it possible to reduce the size of the communication device 5.

OTHER EMBODIMENTS

A radio frequency module and a communication device according to the embodiment of the present disclosure are described above using the embodiment and the example. However, the radio frequency module and the communication device according to the present disclosure are not limited to those described in the embodiment and the example. Other embodiments implemented by combining components in the above embodiment and example, variations obtained by applying various modifications conceivable by a person skilled in the art to the above embodiment and example without departing from the spirit of the present disclosure, and various devices including the radio frequency module and the communication device are also included in the present disclosure.

For example, in the radio frequency module and the communication device according to the above embodiment and its example, additional circuit elements and wires may be inserted in paths connecting circuit elements and signal paths illustrated in the drawings.

The present disclosure can be widely used for communication devices, such as a mobile phone, as a radio frequency module disposed in a multiband front-end unit.

1, 1A radio frequency module
2 antenna
3 RF signal processing circuit (RFIC)
4 baseband signal processing circuit (BBIC)
5 communication device
10 first base part
10a, 10b, 80a, 80b, 90a, 90b major surface
10c side surface
11 PA control circuit
12 Si substrate
13 insulating layer
14 Si layer
15 wiring layer
16 via
17 SiN layer
18, 22, 23, 24, 72g, 92g electrode
20 second base part
20d epitaxial layer
20n GaAs base layer
21 power amplifier
21B base layer
21C collector layer
21E emitter layer
23a, 24a columnar conductor
23b, 24b bump electrode
31 low-noise amplifier
42, 43, 44, 45 matching circuit
42C capacitor
42L inductor
52, 53, 54 switch
61, 62 duplexer
61R, 62R reception filter
61T, 62T transmission filter
63 diplexer
63H, 63L filter
70, 75 semiconductor IC
71, 81, 82 resin component
80 module substrate
85 metal shield layer
90 mounting board
95 solder
100 antenna connection terminal
110 control signal terminal
120 transmission input terminal
130 reception output terminal
150 external connection terminal
150g ground terminal

The invention claimed is:

1. A radio frequency module comprising:
a module substrate including a first major surface and a second major surface, the first major surface and the second major surface facing each other;
a first base part being at least partially comprised of a first semiconductor material, wherein an electronic circuit is provided in the first base part;
a second base part being at least partially comprised of a second semiconductor material having a thermal conductivity lower than a thermal conductivity of the first semiconductor material, wherein an amplifier circuit is provided in the second base part; and
an external connection terminal disposed on or over the second major surface, wherein
the first base part and the second base part are disposed on or over the second major surface out of the first major surface and the second major surface; and
the second base part is disposed between the module substrate and the first base part, is joined to the first base part, and is connected to the second major surface via a first electrode.

2. The radio frequency module according to claim 1, wherein
the first base part includes a third major surface and a fourth major surface, the third major surface and the fourth major surface facing each other;
the second base part is joined to the third major surface of the first base part; and
the radio frequency module further comprises a metal layer provided on the fourth major surface.

3. The radio frequency module according to claim 2, wherein
the metal layer is connected to a ground of the amplifier circuit and a ground of the electronic circuit.

4. The radio frequency module according to claim 2, wherein
in plan view of the module substrate, a joint interface between the first base part and the second base part at least partially overlaps the metal layer.

5. The radio frequency module according to claim 1, wherein
the second base part is thinner than the first base part.

6. The radio frequency module according to claim 1, wherein
the first base part includes a third major surface, a fourth major surface and a side surface, the third major surface and the fourth major surface facing each other, and the side surface connecting the third major surface to the fourth major surface;
the second base part is joined to the third major surface of the first base part; and
an arithmetic average roughness of the fourth major surface is greater than an arithmetic average roughness of the side surface.

7. The radio frequency module according to claim 1, wherein
the first base part is connected to the second major surface via a second electrode.

8. The radio frequency module according to claim 1, wherein
the amplifier circuit includes a power amplifier.

9. The radio frequency module according to claim 1, wherein
the amplifier circuit includes a circuit element including a collector layer, a base layer, and an emitter layer; and
the collector layer, the base layer, and the emitter layer are stacked in an order of the collector layer, the base layer, and the emitter layer from a side closer to the first base part.

10. The radio frequency module according to claim 9, further comprising:
a low-noise amplifier disposed on or over the second major surface, wherein
in plan view of the module substrate, a ground terminal is disposed on or over the second major surface and between the first and second base parts and the low-noise amplifier.

11. The radio frequency module according to claim 1, wherein
the electronic circuit includes a control circuit configured to control the amplifier circuit.

12. The radio frequency module according to claim 1, further comprising:
an impedance matching element connected to the amplifier circuit, wherein
the impedance matching element is disposed on or over the first major surface and at least partially overlaps the second base part in plan view of the module substrate.

13. A communication device comprising:
an RF signal processing circuit configured to process a radio frequency signal to be transmitted via an antenna; and
the radio frequency module according to claim 1 configured to transmit the radio frequency signal between the antenna and the RF signal processing circuit.

14. The communication device according to claim 13, further comprising:
a mounting board on or over which the radio frequency module is mounted, wherein
the first base part includes a third major surface and a fourth major surface, the third major surface and a fourth major surface facing each other;
the second base part is joined to the third major surface of the first base part; and
a major surface of the mounting board is in contact with the fourth major surface.

15. A communication device comprising:
an RF signal processing circuit configured to process a radio frequency signal to be transmitted via an antenna;
the radio frequency module according to claim 2 configured to transmit the radio frequency signal between the antenna and the RF signal processing circuit; and
a mounting board on or over which the radio frequency module is mounted, wherein
a third electrode provided on a major surface of the mounting board is connected to the metal layer via solder.

16. The radio frequency module according to claim 3, wherein
in plan view of the module substrate, a joint interface between the first base part and the second base part at least partially overlaps the metal layer.

17. A radio frequency module comprising:
a module substrate including a first major surface and a second major surface, the first major surface and the second major surface facing each other;
a first base part being at least partially comprised of silicon, wherein an electronic circuit is formed provided in the first base part;
a second base part being at least partially comprised of gallium arsenide, wherein an amplifier circuit is provided in the second base part; and
an external connection terminal disposed on or over the second major surface, wherein
the first base part and the second base part are disposed on or over the second major surface out of the first major surface and the second major surface; and
the second base part is disposed between the module substrate and the first base part, is joined to the first base part, and is connected to the second major surface via a first electrode.

18. The radio frequency module according to claim 17, wherein
the first base part includes a third major surface and a fourth major surface, the third major surface and the fourth major surface facing each other;
the second base part is joined to the third major surface of the first base part; and
the radio frequency module further comprises a metal layer provided on the fourth major surface.

19. The radio frequency module according to claim 17, wherein
the second base part is thinner than the first base part.

20. The radio frequency module according to claim 2, wherein
the second base part is thinner than the first base part.

* * * * *